Aug. 31, 1948.                H. W. ALLEN                    2,448,406
                              TELESCOPE STAND
Filed Sept. 15, 1945                                   2 Sheets-Sheet 1
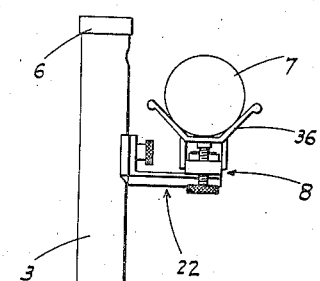
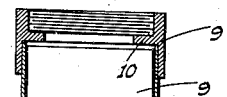
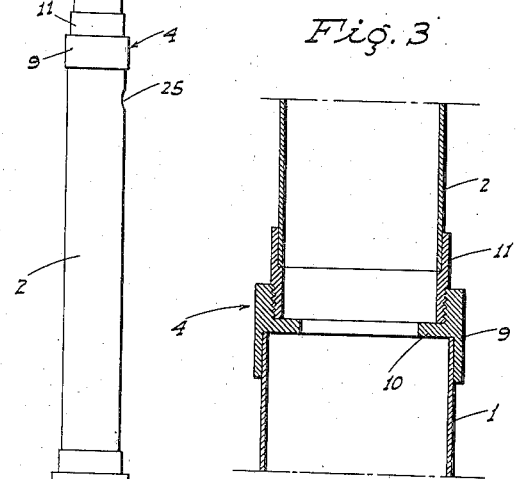
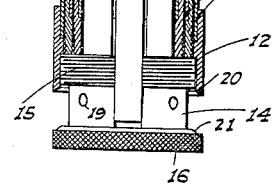
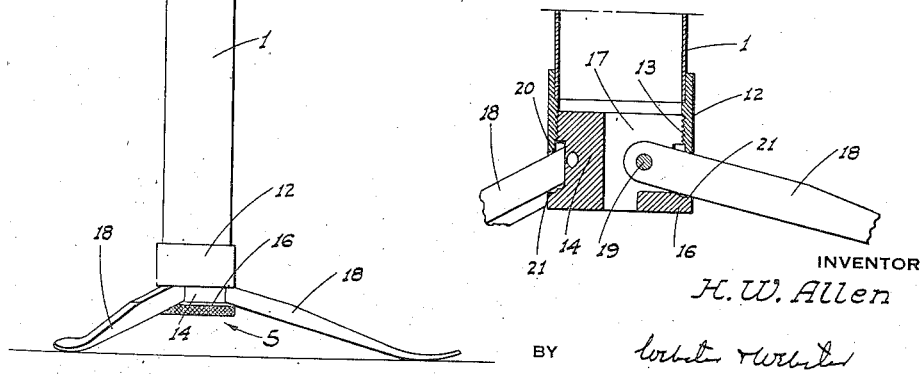
INVENTOR
H. W. Allen
BY
ATTORNEYS Aug. 31, 1948. H. W. ALLEN 2,448,406
TELESCOPE STAND
Filed Sept. 15, 1945 2 Sheets-Sheet 2

INVENTOR
H. W. Allen
BY
ATTORNEYS

Patented Aug. 31, 1948

2,448,406

UNITED STATES PATENT OFFICE 2,448,406

TELESCOPE STAND

Herbert William Allen, Fresno, Calif.

Application September 15, 1945, Serial No. 616,511

3 Claims. (Cl. 248—158)

This invention relates to, and it is an object to provide, a novel stand for supporting a telescope. The stand is especially designed for use by target shooters to spot hits on the target, but may be placed to many other uses.

A further object of the invention is to provide a telescope stand which includes new and useful means for mounting the telescope for vertical or horizontal adjustment.

An additional object of the invention is to provide a telescope stand which is readily demountable; substantially all of the parts of the stand being formed to nest within a base tube which the stand includes, whereby the device may then be readily handled, and transported.

Another object of the invention is to provide a telescope stand, as above, which includes a unique supporting leg or pedestal assembly; the legs of such assembly being foldable to a position whereby they nest in the base tube, and a hub of said assembly being formed to threadingly engage in the lower end of the base tube so as to retain the nested components of the device therein.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is an elevation showing the stand assembled for use.

Figure 2 is an enlarged sectional elevation of the stand demounted, and with substantially all of the parts thereof as nested together.

Figure 3 is an enlarged fragmentary sectional elevation of one of the connection fittings as used between adjacent ends of the tubes which the stand includes.

Figure 4 is an enlarged fragmentary sectional elevation of the leg assembly unfolded and in use.

Figure 5:
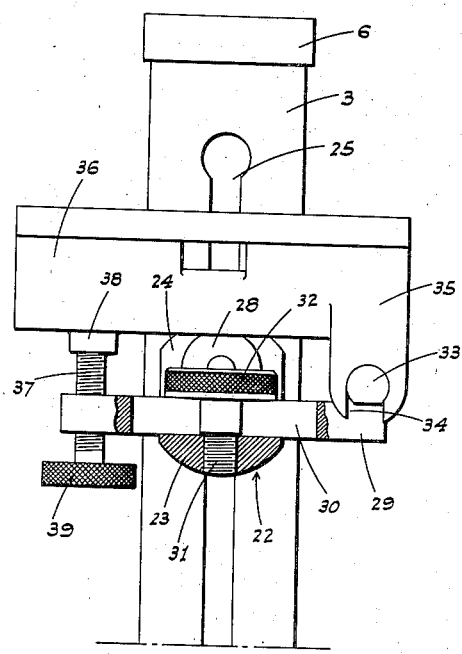
Figure 5 is an enlarged fragmentary side elevation, partly broken away, of the adjustable bracket and saddle assembly which supports the telescope.
Figure 6:
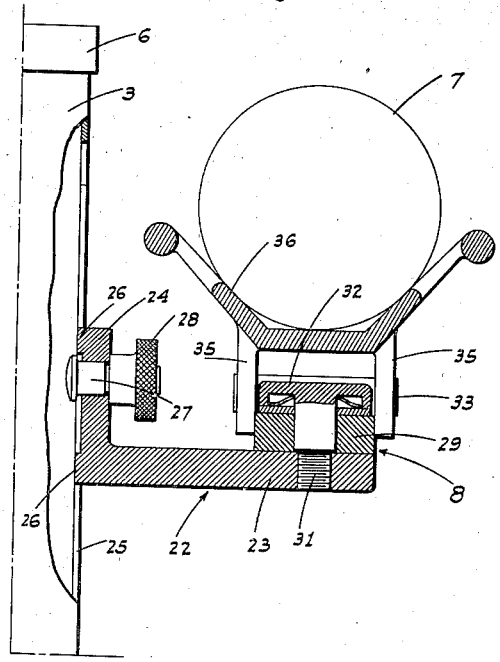
Figure 6 is an enlarged cross section of said adjustable bracket and saddle assembly.
Figure 7:
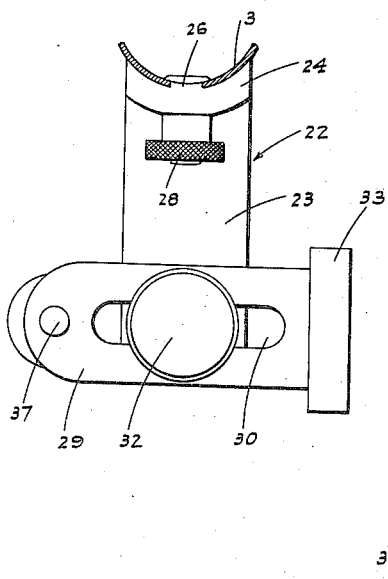
Figure 7 is a plan view of the same.

Referring now more particularly to the characters of reference on the drawings, the improved telescope stand comprises a base tube 1, an intermediate tube 2, and an upper tube 3, all disposed vertically in end to end relation when the device is in use, and detachably coupled at adjacent ends by connection fittings, indicated generally at 4. When connected together the tubes thus form a vertically elongated sectional standard. The base tube 1 is supported, at its lower end, by a foldable leg or pedestal assembly, indicated generally at 5. The top end of the upper tube 3 is permanently closed by a cap 6.

The telescope, indicated generally at 7, is supported by an adjustable bracket and saddle assembly, indicated generally at 8, hereinafter described in detail and which is arranged to be attached, in vertically adjustable relation, to the side of any one of the tubes.

The connection fittings 4 each comprise a collar 9 including, intermediate its ends, a radially inwardly projecting flange 10.

Below the flange 10 the collar 9 is counterbored to fit over the upper end of the lowermost tube, and is attached thereto by sweat soldering or the like. Above the flange 10 the collar 9 is tapped for the reception of the threaded lower end portion of a nipple 11 counterbored, adjacent its upper end, for the reception of the lower end portion of the tube thereabove, and which is secured in said counterbore by sweat soldering or the like.

By reason of the above arrangement it will be seen that the tubes 1, 2, and 3 are readily disconnectable from each other at adjacent ends. The intermediate tube 2, together with its fittings, is of a diameter and length to nest within the base tube 1, while the upper tube 3, together with its fittings, is of a diameter and length to nest within the intermediate tube 2. Thus, when the respective tubes are disconnected from each other they may be all nested together in the manner clearly shown in Fig. 2.

At its lower end the stand, when in use, is supported by the foldable leg or pedestal assembly 5, and which comprises the following:

At its lower end the base tube 1 is fitted with a collar 12 counterbored, at its upper end portion, for the reception of the lower end of said base tube 1, and below said counterbore is tapped, as at 13. A hub 14 is threaded, as at 15, at its inner end portion for threading engagement in the tapped portion 13 of the collar 12; said hub being formed, at its outer end, with an enlarged knurled head 16 for finger engagement. The hub 14 is formed with a plurality of circumferentially spaced, radially extending slots 17 open to the sides and upper end of said hub, but terminating short of the lower end thereof. Legs 18 are pivoted, at their inner ends, on cross pins 19 in the slots 17; said legs being swingable from an unfolded and radiating position, as in Figs. 1 and 4, to an upwardly folded position substantially axially of the hub, as shown in Fig. 2.

When the legs 18 are unfolded and the hub 14 threaded into the collar 12 said legs are forcefully clamped at a downward and outward incline between a taper shoulder 20 on the lower end of said collar 12 and the abutments 21 formed by the hub at the bottom of said radial slots 17. As so assembled the pedestal assembly effectively maintains the stand in upright position.

When the stand is demounted and nested, and after the tubes 2 and 3 have been placed within the base tube 1, the legs 18 of the pedestal assembly are folded and projected into the nested tubes from below; the threaded portion 15 of the hub then being screwed into the collar 12 so as to maintain the nested components against accidental separation, all as is clearly shown in Fig. 2.

The adjustable bracket and saddle assembly, indicated generally at 8, is constructed and mounted as follows:

An L-shaped bracket 22 is disposed with the long leg 23 thereof in substantially horizontal, outwardly projecting relation and with the short leg 24 thereof extending upwardly. On its outer face the short leg 24 is concave, with the radius of such concavity at least equal to the radius of the base tube 1. Each of the tubes 1, 2, and 3 is formed, on the same side thereof, with a keyhole slot 25, and the short leg 24 is provided with vertically spaced guide legs or keys 26 adapted to ride in any one of said slots 25.

A bolt 27 extends transversely through the short leg 24 with the head of said bolt innermost, whereby said bolt, when engaged through one of the slots 25, effectively but vertically adjustably supports the short leg 24, and consequently the bracket 22, from one of the tubes. At its outer end the bolt 27 is provided with a knurled hand nut 28 which maintains said bolt and the bracket in any selected position of vertical adjustment along the tube. By reason of the above arrangement the bracket may be easily but effectively attached, in vertically adjustable relation, to any one of the tubes. In the present embodiment, the bracket is shown attached to the upper tube 3.

Adjacent its outer end the long leg 23 of the bracket 22 supports, on top thereof, a substantially horizontal, longitudinally extending arm 29 vertically slotted lengthwise thereof, as at 30, and a securing bolt 31 having a knurled head 32 on the upper end thereof which secures the arm 29 to the long leg 23 of the bracket for longitudinal adjustment, as well as lateral swinging adjustment in a horizontal plane.

At its forward end the arm 29 is formed with laterally projecting trunnions 33 which normally engage in bearing slots 34 formed in the lower end portions of transversely spaced ears 35 which depend from the normally forward end of a longitudinally extending telescope-supporting saddle 36 disposed in spaced relation above the arm 29. The saddle 36 is normally in the longitudinally extending position of Fig. 5, and is vertically adjustable about the trunnions 33 as an axis by means of an adjustment screw 37 threaded vertically through the arm 29 at the end opposite the trunnions 33 and abutting against a lug 38 formed on the adjacent under side of said saddle. At its lower end the adjustment screw 37 is formed with a knurled head 39. Upon adjustment of the screw 37 the line of sight of the telescope may be raised or lowered, while adjustment of the arm 29 in a lateral horizontal plane changes the line of sight in a sidewise direction.

Figure 8:
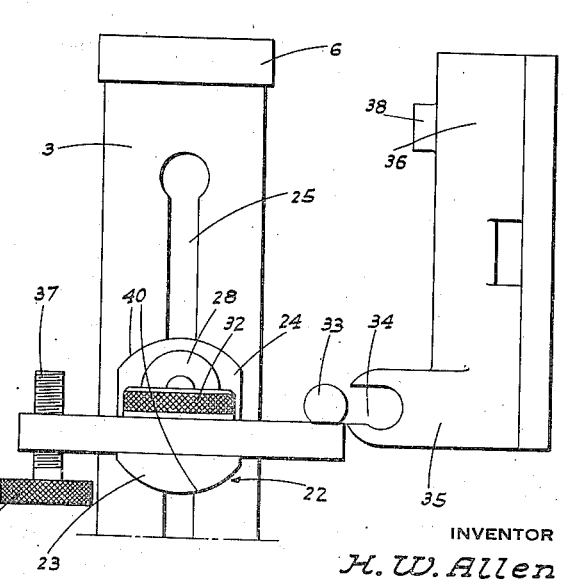
Figure 8 is a side elevation of the adjustable bracket and saddle assembly similar to Fig. 5, but shows the position to which the saddle must be rotated before it can be detached.

The configuration of the trunnions 33 and the bearing slots 34 is such that the ears 35 can be withdrawn from said trunnions only when the saddle 36 is swung upwardly and forwardly to approximately a right angle to its normal working position. In other words, the saddle must be moved to the position shown in Fig. 8 before the trunnions 33 and bearing slots 34 may be engaged or disengaged.

The saddle 36 is normally attached by suitable means to the telescope 7 and remains connected thereto, and is the only part of the device which cannot nest within the base tube 1. When the stand is demounted and nested the arm 29 is swung around lengthwise of the long leg 23 of the bracket 22. The bottom surface of the long leg 23, and the upper end of the short leg 24, are convex, as at 40, so as to fit within the confines of the upper tube 3 when the same is nested; the bracket assembly, except for the saddle, being shown in its nested position in tube 3, as shown in Fig. 2. In this nested position the folded bracket assembly is disposed between the folded legs 18 of the pedestal assembly and the radially inwardly projecting flange 10 of the connection fitting 4 on the normally upper end of the base tube 1; said flange preventing the escape of any of the nested components from the adjacent end of the base tube 1.

The above described telescope stand is very convenient and practical to use, and when not in use it may be demounted and substantially all of the parts thereof nested with a minimum of difficulty. When so nested the stand is easy to handle or transport.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A demountable telescope stand comprising a base tube and a plurality of other tubes, all of said tubes having progressively smaller cross sectional diameters, each tube having a fitting at each end thereof, the outer end of the fitting at one end of each tube being counter-bored and threaded, and the fittings at the other ends of said other tubes being exteriorly threaded, such exterior threads on the fitting of one tube being of a size for threaded engagement with the threads in the bore of the tube of next largest diameter, the interior diameters of the base tube and of the exteriorly threaded fittings and the length of the tubes being such that all of said tubes may be telescopically nested, one within the other, with such fittings in closely engaged concentric relation with each other and with the interior of the base tube, and means to removably retain the tubes in such nested relation.

2. A device as in claim 1 in which said last named means includes an inturned flange at one end of the base tube, and a closure element screw threaded into the opposite end of the base tube.

3. A device as in claim 2 including extensible and collapsible supporting legs mounted on and carried by said closure element and which legs may be collapsed and projected into nested relation with respect to the tubes as the closure element is screwed into the end of the base tube.

HERBERT WILLIAM ALLEN.

REFERENCES CITED

The following references are of record in the file of this patent:

UNITED STATES PATENTS

| Number | Name | Date |
|---|---|---|
| 1,055,522 | Cumming | Mar. 11, 1913 |
| 2,128,409 | Hager | Aug. 30, 1938 |
| 2,278,250 | Diesbach | Mar. 31, 1942 |
| 2,296,043 | McClary | Sept. 15, 1942 |